(12) United States Patent
Sibbach et al.

(10) Patent No.: US 12,215,634 B1
(45) Date of Patent: Feb. 4, 2025

(54) TURBINE ENGINE INCLUDING A STEAM SYSTEM

(71) Applicant: General Electric Company, Schenectady, NY (US)

(72) Inventors: Arthur W. Sibbach, Boxford, MA (US); Robert R. Rachedi, Morrow, OH (US); Kirk D. Gallier, Liberty Township, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/515,881

(22) Filed: Nov. 21, 2023

(51) Int. Cl.
*F02C 9/16* (2006.01)
*F02C 3/30* (2006.01)

(52) U.S. Cl.
CPC . *F02C 9/16* (2013.01); *F02C 3/30* (2013.01)

(58) Field of Classification Search
None
See application file for complete search history.

(56) References Cited

U.S. PATENT DOCUMENTS

| | | | |
|---|---|---|---|
| 4,081,956 A | 4/1978 | Baker et al. | |
| 4,569,195 A * | 2/1986 | Johnson | F01K 21/047 60/39.55 |
| 4,949,544 A * | 8/1990 | Hines | F01K 21/047 60/736 |
| 5,050,109 A * | 9/1991 | Ladd | G01N 25/56 73/76 |
| 5,054,279 A * | 10/1991 | Hines | F01K 21/047 60/39.5 |
| 5,357,741 A * | 10/1994 | Talabisco | F02C 3/30 60/39.55 |
| 5,896,740 A | 4/1999 | Shouman | |
| 6,260,350 B1 * | 7/2001 | Horii | F02C 7/1435 60/39.53 |
| 6,477,842 B1 | 11/2002 | Nagata et al. | |

(Continued)

FOREIGN PATENT DOCUMENTS

DE 102009022491 A1 1/2011

OTHER PUBLICATIONS

David L. Daggett, "Water Injection on Commercial Aircraft to Reduce Airport Nitrogen Oxides," NASA/TM—2010-213179, Mar. 2010. (Year: 2010).*

(Continued)

*Primary Examiner* — David P. Olynick
(74) *Attorney, Agent, or Firm* — Venable LLP; Michael C. Sanko; Michele V. Frank (57) ABSTRACT

A turbine engine for an aircraft includes a turbo-engine with a core air flow path, a fan having a fan shaft coupled to the turbo-engine to rotate the fan shaft, and a steam system. A combustor is located in the core air flow path to combust fuel and to generate combustion gases. The steam system extracts water from the combustion gases and vaporizes the water to generate steam. The steam system is fluidly coupled to the core air flow path to inject the steam into the core air flow path. The steam system includes a controller configured to determine a water content of the core air upstream of the steam injection location and to change a position of a steam flow control valve to control the flow of the steam into the core air flow path.

20 Claims, 5 Drawing Sheets

(56) References Cited

U.S. PATENT DOCUMENTS

| | | | |
|---|---|---|---|
| 6,805,483 B2 * | 10/2004 | Tomlinson | F23N 5/003 60/803 |
| RE38,831 E * | 10/2005 | Horii | F02C 7/1435 60/39.53 |
| 7,367,192 B2 | 5/2008 | Hattori et al. | |
| 8,613,186 B2 | 12/2013 | Koganezawa et al. | |
| 8,813,473 B2 | 8/2014 | Fletcher et al. | |
| 8,984,894 B2 | 3/2015 | Droux et al. | |
| 9,249,738 B2 * | 2/2016 | Nemet | F02C 9/28 |
| 9,689,280 B2 | 6/2017 | Watanabe et al. | |
| 11,603,798 B1 | 3/2023 | Terwilliger et al. | |
| 11,828,200 B2 * | 11/2023 | Terwilliger | F01K 27/02 |
| 2007/0214766 A1 * | 9/2007 | Obana | F01K 9/04 60/39.15 |
| 2008/0178659 A1 * | 7/2008 | Spinelli | G01N 25/58 73/29.01 |
| 2010/0000222 A1 * | 1/2010 | Price | F02C 9/28 60/773 |
| 2011/0270503 A1 * | 11/2011 | Stuttaford | F02C 7/22 701/100 |
| 2012/0285175 A1 | 11/2012 | Fletcher et al. | |
| 2014/0090353 A1 * | 4/2014 | Simons | F02C 9/16 60/39.5 |
| 2022/0297844 A1 | 9/2022 | Mackin et al. | |
| 2023/0374911 A1 * | 11/2023 | Terwilliger | F02C 3/22 |
| 2023/0374941 A1 * | 11/2023 | Terwilliger | F02C 3/305 |
| 2024/0026816 A1 * | 1/2024 | Terwilliger | F02C 3/22 |

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.
MTU Aero Engines, "Water-enhanced turbofan," available at https://www.mtu.de/technologies/clean-air-engine/water-enhanced-turbofan/, as viewed on Jun. 30, 2023.
Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.
Slides from Sustainable Water-Injecting Turbofan Comprising Hybrid-Electrics (SWITCH) Introduction at the 2023 NPSS Annual Consortium Meeting, Mar. 10, 2023.
Sibbach et al., U.S. Appl. No. 18/366,249, filed Aug. 7, 2023.
Sibbach et al., U.S. Appl. No. 18/463,774, filed Sep. 8, 2023.
Sibbach et al., U.S. Appl. No. 18/463,782, filed Sep. 8, 2023.
Sibbach, U.S. Appl. No. 18/468,189, filed Sep. 15, 2023.
Sibbach et al., U.S. Appl. No. 18/468,198, filed Sep. 15, 2023.
Sibbach et al., U.S. Appl. No. 18/366,256, filed Aug. 7, 2023.
Sibbach et al., U.S. Appl. No. 18/451,429, filed Aug. 17, 2023.
Sibbach, U.S. Appl. No. 18/448,597, filed Aug. 11, 2023.

* cited by examiner

TURBINE ENGINE INCLUDING A STEAM SYSTEM

TECHNICAL FIELD

The present disclosure relates generally to turbine engines including a steam system.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and the like, may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

References to "inner" and "outer" when discussed in the context of radial directions refer to positions relative to the longitudinal centerline of the component.

As used herein, a "bypass ratio" of a turbine engine is a ratio of bypass air through a bypass of the turbine engine to core air through a core inlet of a turbo-engine of the turbine engine.

As used herein, a "compression ratio" of a compressor is a ratio of a compressor exit pressure at an exit of the compressor to a compressor inlet pressure at an inlet of the compressor.

The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

As used herein, a "core air flow path zone" is a region or area of the core air flow path were core air flowing through the core air flow path has different or distinct thermodynamic properties from surrounding or adjoining regions of the core air flow path.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section of the turbine engine to generate combustion gases for driving a turbine in the core section. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. After flowing through the steam turbine, the steam may be injected into a core air flow path and, more specifically, into the combustor. While some steam flowing through a primary combustion zone of the combustor is beneficial, steam at mass flows greater than, for example, water-to-air ratios of ten percent (10%) or fifteen percent (15%) may result in flame stability issues and flame dynamics issues during combustion of the fuel, particularly, for highly reactive fuels such as diatomic hydrogen. When the aircraft (turbine engine) is operating in moisture laden atmospheric conditions, such as rain, hail, or clouds, for example, the air flowing into the turbine engine and thus the core air flowing into the core air flow path includes water content. Accordingly, the amount of steam injected into the core air by the steam system may be controlled based on the water content of the incoming core air, and the amount of steam injected into the core air by the steam system may be reduced when the turbine engine is operating in moisture laden atmospheric conditions as compared to other atmospheric conditions with a lower moisture content.

Instead, as discussed herein, the steam may be injected into the core air flow path at a plurality of locations with a portion of the steam flowing through the primary combustion zone. In this way, the water-to-air ratio of the primary air flowing through the primary combustion zone can be maintained at a level low enough for good flame performance.

Figure 1:
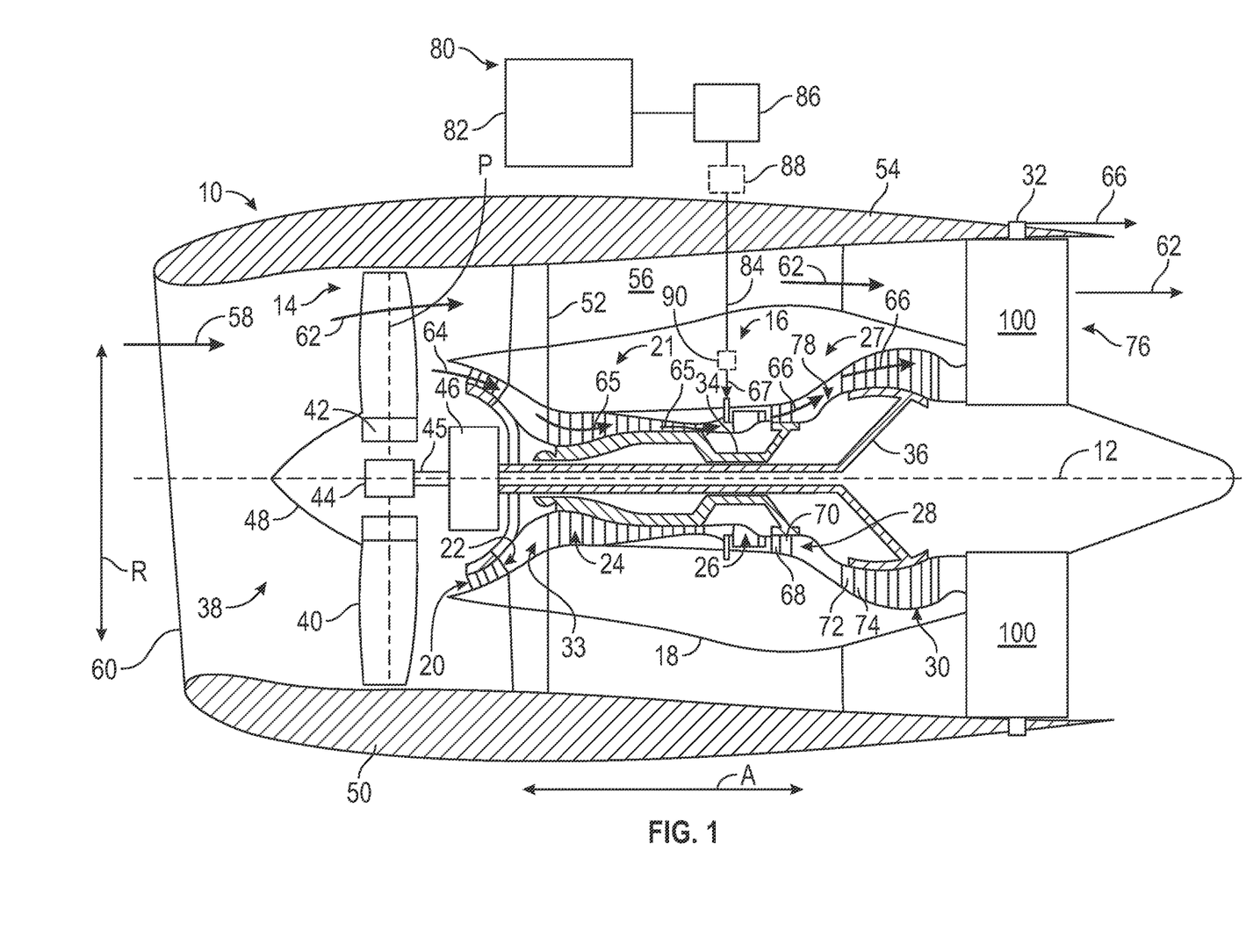
FIG. 1 is a schematic cross-sectional diagram of a turbine engine including a steam system, taken along a longitudinal centerline axis of the turbine engine, according to the present disclosure.

Referring now to the drawings, FIG. 1 is a schematic cross-sectional diagram of a turbine engine 10 including a steam system 100, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a turbo-engine 16 disposed downstream from the fan section 14.

The turbo-engine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor (LPC) 22 followed downstream by a high-pressure compressor (HPC) 24, a combustor 26, a turbine section 27, including a high-pressure turbine (HPT) 28, followed downstream by a low-pressure turbine (LPT) 30, and one or more core exhaust nozzles 32. A high-pressure (HP) shaft 34 or a spool drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates. A low-pressure (LP) shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the combustor 26, the turbine section 27, and the one or more core exhaust nozzles 32 together define a core air flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 to define a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an engine inlet 60 of the nacelle 50 and/or the fan section 14. The engine inlet 60 may also be referred to as a fan inlet. As the volume of air 58 passes across the fan blades 40, a first portion of air (bypass air 62) is directed or routed into the bypass airflow passage 56, and a second portion of air (core air 64) is directed or is routed into the upstream section of the core air flow path 33, or, more specifically, into the core inlet 20. The ratio between the first portion of air (bypass air 62) and the second portion of air (core air 64) is known as a bypass ratio. In some embodiments, the bypass ratio is greater than 18:1, enabled by a steam system 100, detailed further below. The pressure of the core air 64 is then increased by the LPC 22, generating compressed air 65, and the compressed air 65 is routed through the HPC 24 and further compressed before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65. The HPC 24 has a compression ratio greater than 20:1, such as, in a range of 20:1 to 40:1. The compression ratio is a ratio of a pressure of a last stage of the HPC 24 to a pressure of a first stage of the HPC 24. The compression ratio greater than 20:1 is enabled by the steam system 100, as detailed further below.

As noted above, the fuel 67 is injected to the combustor 26 and, more specifically, a combustion chamber (not shown) of the combustor 26 using a fuel nozzle, which may be part of a swirler/fuel nozzle assembly (a mixer assembly). As noted above, the compressor section 21, including the HPC 24, pressurizes air, and the combustor 26 receives an annular stream of this pressurized air from a discharge outlet of the HPC 24. The mixer assembly may include a plurality of swirler vanes as part of a swirler that is used to swirl and to generate turbulence in compressed air received from the HPC 24 (referred to herein as primary air flowing through the mixer assembly). The fuel nozzle injects fuel 67 into the turbulent airflow of the primary air and the turbulence promotes rapid mixing of the fuel 67 with the primary air, generating a fuel-air mixture. The fuel-air mixture is provided to the combustion chamber from the mixer assembly for combustion. Ignition of the fuel-air mixture is accomplished by an igniter (not shown), and the resulting combustion gases 66 flow in the axial direction A of the turbine engine 10 toward and into an annular turbine nozzle of the HPT 28. Much of the fuel 67 injected by the mixer assembly is combusted in a primary combustion zone in the region of the combustion chamber directly downstream of the mixer assembly. The turbine nozzle is defined by an annular flow channel that includes a plurality of radially extending, circumferentially-spaced HPT stator vanes 68 (FIG. 1) that turn the gases so that the gases flow angularly and impinge upon the HPT rotor blades 70 (FIG. 1) of a turbine rotor of the HPT 28. The HPT 28 includes a rotor having a plurality of the HPT rotor blades 70. The HPT rotor blades 70 are circumferentially spaced, and the HPT stator vanes 68 are upstream of the HPT rotor blades 70. The rotor may be, for example, a disk or a blisk drivingly connected to the HP shaft 34.

The combustion gases 66 are routed into the HPT 28 and expanded through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HP shaft 34, thus, causing the HP shaft 34 to rotate, supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator vanes 72 that are coupled to the outer casing 18 and LPT rotor blades 74 that are coupled to the LP shaft 36, thus, causing the LP shaft 36 to rotate, supporting operation of the LPC 22 and rotation of the fan 38 via the gearbox assembly 46. One or more stages may be used in each of the HPT 28 and the LPT 30. The HPC 24 having a compression ratio in a range of 20:1 to 40:1 results in the HPT 28 having a pressure expansion ratio in a range of 1.5:1 to 4:1 and the LPT 30 having a pressure expansion ratio in a range of 4.5:1 to 28:1.

The combustion gases 66, after being routed through the steam system 100 (as discussed below), are subsequently routed through the one or more core exhaust nozzles 32 of the turbo-engine 16 to provide propulsive thrust. Simultaneously with the flow of the core air 64 through the core air flow path 33, the bypass air 62 is routed through the bypass airflow passage 56 before being exhausted from a fan bypass nozzle 76 of the turbine engine 10, also providing propulsive thrust. The HPT 28, the LPT 30, and the one or more core exhaust nozzles 32 at least partially define a hot gas path 78 for routing the combustion gases 66 through the turbo-engine 16.

As noted above, the compressed air 65 (the core air 64) is mixed with the fuel 67 in the combustor 26 to form a fuel and air mixture, and combusted, generating combustion gases 66 (combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel ($H_2$), and, while hydrogen-based fuel may include blends with hydrocarbon fuels, the fuel 67 used herein is unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a pump 86 to induce the flow of the fuel 67 through the fuel delivery assembly 84 to the combustor 26. In this way, the pump 86 pumps the fuel 67 from the fuel tank 82, through the fuel delivery assembly 84, and into the combustor 26. The fuel system 80 and, more specifically, the fuel tank 82 and the fuel delivery assembly 84, either collectively or individually, may be a fuel source for the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the pump 86. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel, and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
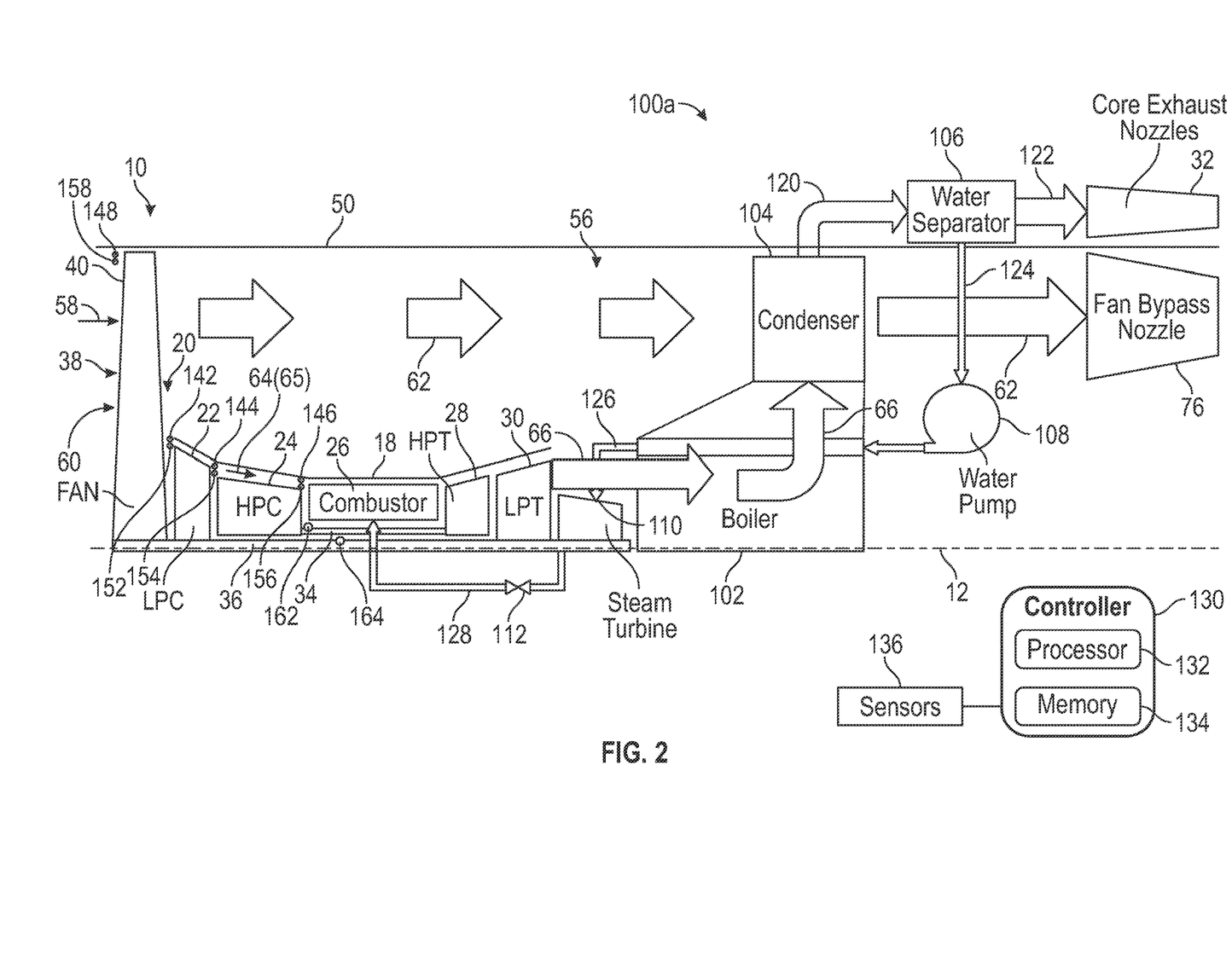
FIG. 2 is a schematic diagram of the turbine engine and the steam system of FIG. 1, according to the present disclosure.

FIG. 2 is a schematic diagram of the turbine engine 10 having a steam system 100a, according to an embodiment of the present disclosure. For clarity with the other steam systems discussed herein, the steam system 100a of this embodiment will be referred to as a first steam system 100a. The first steam system 100a may be used as the steam system 100 in the turbine engine 10 shown in FIG. 1. For clarity, various features of the turbine engine 10 described and shown above are shown schematically in FIG. 2 and some components are not shown in FIG. 2, but the description of such components also applies here. The first steam system 100a includes a boiler 102, a condenser 104, a water separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and is positioned within the bypass airflow passage 56. The condenser 104 can include any type of condenser for condensing water (e.g., in liquid form) from the exhaust (e.g., the combustion gases 66).

The water separator 106 is in fluid communication with the condenser 104 for receiving cooled exhaust (combustion gases 66) having condensed water entrained therein. The water separator 106 is also in fluid communication with the one or more core exhaust nozzles 32 and with the water pump 108. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the turbine engine 10, such as, for example, radially inward of the nacelle 50, closer to the turbo-engine 16. The water separator 106 may be driven to rotate by one of the engine shafts, such as the HP shaft 34 or the LP shaft 36. As noted above, the boiler 102 receives liquid water from a water source to generate steam or water vapor. In the embodiment depicted in FIG. 2, the condenser 104 and the water separator 106, individually or collectively, are the water source for the boiler 102.

The water pump 108 is in fluid communication with the water separator 106 and with the boiler 102. The water pump 108 is in fluid communication with the condenser 104 via the water separator 106. The water pump 108 may be any suitable pump, such as a centrifugal pump or a positive displacement pump. The water pump 108 directs the separated liquid water 124 through the boiler 102 where the water 124 is converted back to steam. This steam is sent through the steam turbine 110, and then injected into core air flow path 33, such as into the combustor 26.

In operation, the combustion gases 66, also referred to as exhaust, flow from the LPT 30 into the boiler 102. The combustion gases 66 transfer heat into the water 124 (e.g., in liquid form) within the boiler 102, as detailed further below. The combustion gases 66 then flow into the condenser 104. The condenser 104 condenses the water 124 (e.g., in liquid form) from the combustion gases 66. The bypass air 62 flows through the bypass airflow passage 56 and over or through the condenser 104 and extracts heat from the combustion gases 66, cooling the combustion gases 66 and condensing the water 124 from the combustion gases 66, to generate an exhaust-water mixture 120. The bypass air 62 is then exhausted out of the turbine engine 10 through the fan bypass nozzle 76 to generate thrust, as detailed above. The condenser 104 thus may be positioned in bypass airflow passage 56.

The exhaust-water mixture 120 flows into the water separator 106. The water separator 106 separates the water 124 from the exhaust of the exhaust-water mixture 120 to generate separate exhaust 122 and the water 124. The exhaust 122 is exhausted out of the turbine engine 10 through the one or more core exhaust nozzles 32 to generate thrust, as detailed above. The boiler 102, the condenser 104, and the water separator 106 thus also define a portion of the hot gas path 78 (see FIG. 1) for routing the combustion gases 66, the exhaust-water mixture 120, and the exhaust 122 through the first steam system 100a of the turbine engine 10.

The water pump 108 pumps the water 124 (e.g., in liquid form) through one or more water lines (as indicated by the arrow for the water 124 in FIG. 2) and the water 124 flows through the boiler 102. As the water 124 flows through the boiler 102, the combustion gases 66 flowing through the boiler 102 transfer heat into the water 124 to vaporize the water 124 and to generate the steam 126 (e.g., vapor). The steam turbine 110 includes one or more stages of steam turbine blades (not shown) and steam turbine stators (not shown). The steam 126 flows from the boiler 102 into the steam turbine 110, through one or more steam lines (as indicated by the arrow for the steam 126 in FIG. 2), causing the steam turbine blades of the steam turbine 110 to rotate, generating additional work in an output shaft (e.g., one of the engine shafts) connected to the turbine blades of the steam turbine 110.

As noted above, the turbo-engine 16 includes shafts, also referred to as engine shafts, coupling various rotating components of the turbo-engine 16 and other thrust producing components such as the fan 38. In the turbo-engine 16 shown in FIG. 1, these engine shafts include the HP shaft 34 and the LP shaft 36. The steam turbine 110 is coupled to one of the engine shafts of the turbo-engine 16, such as the HP shaft 34 or the LP shaft 36. In the illustrated embodiment, the steam turbine 110 is coupled to the LP shaft 36. As the steam 126 flows from the boiler 102 through the steam turbine 110, the kinetic energy of this gas is converted by the steam turbine 110 into mechanical work in the LP shaft 36. The reduced temperature steam (as steam 128) exiting the steam turbine 110 is then injected into the core air flow path 33, such as into the combustor 26, upstream of the combustor 26, or downstream of the combustor 26. The steam 128 flows through one or more steam lines from the steam turbine 110 to the core air flow path 33. The steam 128 injected into the core air flow path 33 adds mass flow to the core air 64 such that less core air 64 is needed to produce the same amount of work through the turbine section 27. In this way, the first steam system 100a extracts additional work from the heat in exhaust gas that would otherwise be wasted. The steam 128 injected into the core air flow path 33 is in a range of 20% to 50% of the mass flow through the core air flow path 33.

The steam turbine 110 may have a pressure expansion ratio in a range of 2:1 to 6:1. The pressure expansion ratio is a ratio of the pressure at an inlet of the steam turbine 110 to the pressure at an exit of the steam turbine 110. The steam turbine 110 may contribute approximately 25% of the power to the LP shaft 36 (or to the HP shaft 34) when the first steam system 100a recovers approximately 70% of the water 124 and converts the water 124 into the steam 126. The steam turbine 110 has a pressure expansion ratio in a range of 2:1 to 6:1, the LPT 30 has a pressure expansion ratio in a range of 4.5:1 to 28:1, and the steam 128 contributes to 20% to 50% of the mass flow through the core air flow path 33. The steam turbine 110 expands the steam 126, reducing the energy of the steam 128 exiting the steam turbine 110 and reducing the temperature of the steam 128 to approximately a temperature of the compressed air 65 (see FIG. 1) that is discharged from the HPC 24. Such a configuration enables the steam 128 to reduce hot spots in the combustor 26 from the combustion of the fuel (e.g., in particular, when the fuel is supercritical hydrogen or gaseous hydrogen).

The steam 128 injected into the core air flow path 33 also enables the HPT 28 to have a greater energy output with fewer stages of the HPT 28 as compared to HPTs without the benefit of the present disclosure. For example, the additional mass flow from the steam 128 through the turbine section 27 helps to produce a greater energy output. In this way, the HPT 28 may only have one stage capable of sustainably driving a greater number of stages of the HPC 24 (e.g., ten, eleven, or twelve stages of the HPC 24) due to the higher mass flow (resulting from the steam injection) exiting the combustor 26. The steam 128 that is injected into the core air flow path 33 enables the HPT 28 to have only one stage that drives the plurality of stages of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

With less core air 64 (see FIG. 1) needed due to the added mass flow from the steam 126, the compression ratio of the HPC 24 may be increased as compared to HPCs without the benefit of the present disclosure. In this way, the HPC 24 has a compression ratio greater than 20:1. In some embodiments, the compression ratio of the HPC 24 is in a range of 20:1 to 40:1. Thus, the compression ratio of the HPC 24 is increased, increasing the thermal efficiency of the turbine engine 10 as compared to HPCs and turbine engines without the benefit of the present disclosure. Further, the HPC 24 may have a reduced throat area due to the added mass flow in the turbo-engine 16 provided by the steam 126, 128 injected into the turbo-engine 16. Accordingly, the HPC 24 has a reduced size (e.g., outer diameter) and a reduced weight, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 includes one or more compressor bleed valves that are controlled to be opened to bleed a portion of the compressed air 65 (see FIG. 1) from the HPC 24. The one or more compressor bleed valves may be positioned between a fourth stage of the HPC 24 and a last stage of the HPC 24. The HPC stator vanes are variable stator vanes, and the one or more compressor bleed valves help to balance the air flow (e.g., the compressed air 65) through all stages of the HPC 24. Such a balance, in combination with the steam 128 injected into the core air flow path 33, enables the number of stages of the HPC 24 to include ten to twelve stages for compression ratios to be greater than 20:1, and, such as, in a range of 20:1 to 40:1.

The additional work that is extracted by the first steam system 100a and the steam 128 injected into the core air flow path 33 enables a size of the turbo-engine 16 (FIG. 1) to be reduced, increasing the bypass ratio of the turbine engine 10, as compared to turbine engines without the benefit of the present disclosure. In this way, the turbine engine 10 has a bypass ratio greater than 18:1, such as, in a range of 18:1 to 100:1, in a range of 25:1 to 85:1, or in a range of 28:1 to 70:1. In this way, the first steam system 100a can enable an increased bypass ratio in which the turbine engine 10 can move a greater mass of air through the bypass, reducing the pressure ratio of the fan 38 and increasing the efficiency of the turbine engine 10 as compared to turbine engines without the benefit of the present disclosure.

The steam system 100 depicted in FIG. 2 also includes a controller 130. The controller 130 may be a separate, stand-alone controller operable as described herein, or may be another controller of the turbine engine 10, such as an engine controller. The engine controller may be a Full Authority Digital Engine Control (FADEC). The controller 130 is configured to operate various aspects of the steam system 100a, including, in this embodiment, a steam control valve 112. In this embodiment, the controller 130 is a computing device having one or more processors 132 and one or more memories 134. The processor 132 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 134 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 134 can store information accessible by the processor 132, including computer-readable instructions that can be executed by the processor 132. The instructions can be any set of instructions or a sequence of instructions that, when executed by the processor 132, causes the processor 132 and the controller 130 to perform operations. In some embodiments, the instructions can be executed by the processor 132 to cause the processor 132 to complete any of the operations and functions for which the controller 130 is configured, as will be described further below. The instructions can be software written in any suitable programming language, or can be implemented in hardware. Additionally, and/or alternatively, the instructions can be executed in logically and/or virtually separate threads on the processor 132. The memory 134 can further store data that can be accessed by the processor 132.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 does not operate in a steady operating condition. Instead, the turbine engine 10 is operated in various different operating conditions. For example, during a normal operating cycle for an aircraft, the turbine engine 10 may operate at high power for takeoff and climb (e.g., a high-power operation or condition) and at a low power (e.g., idle) for descent (a low-power operation or condition). High power and low power are taken relative to each other in this context. During flight, the turbine engine 10 may also be operated at cruise, which includes power conditions (operation) between the high-power condition and the low-power condition discussed above. At the different operating conditions, the amount of steam that is injected into the combustor 26 may be adjusted to have, for example, less steam for a low-power operation and more steam for a high-power operation.

The flow of the steam 128 into the core air flow path 33 may be controlled, at least in part, by one or more valves. The first steam system 100a depicted in FIG. 2 includes one or more flow control valves positioned between the boiler 102 and the combustor 26 to control the amount of steam flowing into the core air flow path 33, such as into the combustor 26. In this embodiment, a steam control valve 112 is positioned in the flow path (e.g., line) between the steam turbine 110 and the core air flow path 33, such as between the steam turbine 110 and the combustor 26. The steam control valve 112 is positioned upstream of the core air flow path 33 and downstream of the steam turbine 110 to control the flow of the steam 128 into the core air flow path 33. Any suitable flow control valve may be used as the steam control valve 112. Such flow control valves may have a closed position and a plurality of open positions, including a fully open position. The flow control valves may be electrically operable valves, hydraulically operable valves, or pneumatically operable valves. When the flow control valves are hydraulically operable, the hydraulic fluid may be suitable fluids of the turbine engine 10 including, for example, the fuel 67, lubrication oil, and the like.

The first steam system 100a is fluidly coupled to inject the steam into the core air flow path 33 at one or more steam injection locations or steam injection zones, adding mass flow to the core air 64, as discussed above. As the core air 64 flows through the core air flow path 33, the thermodynamics of the core air 64 (and combustion gases 66) changes, as discussed above. Accordingly, the core air flow path 33 includes a plurality of core air flow path zones. As used herein, a core air flow path zone is a portion (i.e., a region or an area) of the core air flow path were the core air 64 has different or distinct thermodynamic properties from surrounding or adjoining regions. For example, the LPC 22 may be a core air flow path zone and the HPC 24 each may be a core air flow path zone as the pressure and the temperature of the core air 64 is increased in each of the LPC 22 and the HPC 24. In addition, the LPC 22 and the HPC 24 may be multi-stage compressors and each stage of the LPC 22 or HPC 24 may also be a core air flow path zone. Similarly, the combustor 26 and, more specifically, a primary combustion zone within the combustor 26, discussed below, may be a core air flow path zone. Similar to the LPC 22 and the HPC 24, the HPT 28 and the LPT 30 may be core air flow path zones, and each stage of the HPT 28 and LPT 30 may be a core air flow path zone. The core air flow path 33 of the turbine engine 10 is annular (i.e., annular about the longitudinal centerline axis 12) and each core air flow path zone may be annular bands of the turbine engine 10 and, more specifically, the core air flow path 33. Each steam injection zone corresponds to one of the core air flow path zones.

In the embodiment depicted in FIG. 2, one steam injection zone is depicted and the depicted steam injection zone is a core air flow path zone of the combustor 26, including, for example, the primary combustion zone of the combustor 26. For example, the steam 128 may be injected with the fuel 67 (FIG. 1) into the primary air and directly into the primary combustion zone in the mixer assembly, with the steam 128 being injected into the combustor 26 in combination with the fuel 67 (FIG. 1). The combined steam/fuel injector may be used when the fuel 67 is a hydrogen fuel to minimize hot spots in the combustor 26 and to control the hydrogen flame.

The controller 130 may be communicatively and operatively coupled to the steam control valve 112 to change the position (i.e., to move) the steam control valve 112 between the plurality of open positions and to control the overall flow rate of the steam 128 entering the core air flow path 33 and, more specifically, the combustor 26. The controller 130 positions the steam control valve 112 in one of the plurality of open positions to provide the desired amount of steam 128 into the core air flow path 33, such as into the combustor 26, as depicted in FIG. 2. The controller 112 opens the steam flow control valve 112 to increase the amount of steam 128 flowing into the core air flow path 33 and closes (moves to a less open position) the steam flow control valve 112 to decrease the amount of steam 128 flowing into the core air flow path 33. The controller 130 may also fully close to the steam flow control valve 112 to turn off the flow of steam 128 into the core air flow path 33.

As noted above, a volume of air 58 flows into the turbine engine 10 through the engine inlet 60, and after flowing over the fan 38, a portion of the volume of air 58 flows into the core air flow path 33 as core air 64 via the core inlet 20. The volume of air 58 is drawn from the air surrounding the turbine engine 10 (ambient air) and thus the moisture content (water content) of the ambient air is the initial water content of the core air 64. The controller 130 controls the position of the steam control valve 112 and thus the amount of steam 128 into the core air flow path 33 to achieve a target water-to-air ratio or mass flow. An initial water content of the core air 64 (water content of the core air 64 upstream of the steam injection location) will impact the total amount of water in the core air 64 downstream of the steam injection location, as the steam 128 adds water to the core air 64 in addition to the initial water content. For the same position of the steam control valve 112, ambient air with a high moisture content will result in a higher water content and mass flow of the core air 64 than ambient air with a low moisture content.

The turbine engine 10 and, more specifically, the controller 130 discussed herein accounts for the water content of the volume of air 58 or, more specifically, the core air 64 upstream of the steam injection location and adjusts the amount of steam 128 flowing into the core air flow path 33 accordingly to achieve the desired water-to-air ratio and mass flow. More specifically, the controller 130 determines the water content of the core air 64 upstream of the steam injection location, as will be discussed further below, and changes the position of the steam flow control valve 112 based on the water content of the core air 64 upstream of the steam injection location.

The controller 130 may receive an input from which the controller 130 can determine the water content of the core air 64 upstream of the steam injection location. The controller 130 may be coupled to one or more sensors 136. The sensors 136 may be located on the aircraft and, more specifically, on the turbine engine 10 to detect a parameter indicative of the water content of the core air 64 upstream of the steam injection location. These sensors 136 are described as being located at a portion of the turbine engine 10 and, more specifically in the flow path of the air being measured by the sensor 136, but the sensors 136 may be located at any location where the parameter being measured can be measured and detected. As depicted in FIG. 2, the controller 130 is coupled to a plurality of sensors 136 to receive input from the plurality of sensors 136.

The plurality of sensors 136 may include a plurality of temperature sensors. A parameter indicative of the water content of the core air 64 upstream of the steam injection location may be temperature. Each temperature sensor is located in the turbine engine 10 to detect the temperature of air flowing through the turbine engine 10. As noted above, the core air 64 is compressed as the core air 64 flows through the core air flow path 33. As the core air 64 is compressed (increased in pressure), the core air 64 also increases in temperature. The inventors have discovered that this temperature increase is impacted by the moisture content of the core air 64. For the same pressure increase, core air 64 having a high water content has a temperature increase that is less than the temperature increase for core air 64 having a low water content. The temperature sensors may be positioned to measure the temperature rise across at least a portion of the compressor. For example, one temperature sensor of the plurality of temperature sensors may be a core inlet temperature sensor 142 located at and, more specifically, in the core inlet 20. The core inlet 20 is also positioned near or at the inlet of the LPC 22 and the core inlet temperature sensor 142 is also a compressor inlet sensor and, more specifically, an LPC inlet temperature sensor. Another temperature sensor of the plurality of temperature sensors is an intermediate compressor temperature sensor 144 located in the core air flow path 33 between the LPC 22 and the HPC 24. The intermediate compressor temperature sensor 144 may be positioned near or at the outlet of the LPC 22 and may be a compressor outlet sensor, more specifically, a LPC outlet temperature sensor. With the core inlet temperature sensor 142 and the intermediate compressor temperature sensor 144 positioned in this way, the core inlet temperature sensor 142 and the intermediate compressor temperature sensor 144 are positioned to measure the temperature increase across the LPC 22. The controller 130 receives an input from each of the core inlet temperature sensor 142 and the intermediate compressor temperature sensor 144 and, then, the controller 130 determines the water content of the compressed air 65 flowing through the LPC 22 based on the temperature increase from the core inlet temperature sensor 142 to the intermediate compressor temperature sensor 144.

Similarly, the intermediate compressor temperature sensor 144 may be positioned near or at the inlet of the HPC 24 and is also compressor inlet sensor and, more specifically, an HPC inlet temperature sensor. Another temperature sensor, an HPC outlet temperature sensor 146, is positioned near or at the outlet of the HPC 24 and is a compressor outlet sensor. With the intermediate compressor temperature sensor 144 and the HPC outlet temperature sensor 146 positioned in this way, the intermediate compressor temperature sensor 144 and the HPC outlet temperature sensor 146 are positioned to measure the temperature increase across the HPC 24. The controller 130 receives an input from each of the intermediate compressor temperature sensor 144 and the HPC outlet temperature sensor 146 and, then, the controller 130 determines the water content of the compressed air 65 flowing through the HPC 24 based on the temperature increase from the intermediate compressor temperature sensor 144 to the HPC outlet temperature sensor 146.

Similarly, the fan 38 also generates a pressure increase and, for the purposes discussed herein, the fan 38 is a compressor. Temperature sensors of the plurality of temperature sensors may be positioned to measure the temperature increase across the fan 38 similarly to the temperature increase across the LPC 22 and the HPC 24. For example, a fan inlet temperature sensor 148 may be positioned near or at the engine inlet 60, such as on an inner surface of the nacelle 50. The fan inlet temperature sensor 148 may be a compressor inlet sensor and, more specifically, a fan inlet temperature sensor. The fan inlet temperature sensor 148 may be used in conjunction with another temperature sensor, such as the core inlet temperature sensor 142 positioned at the outlet of the fan 38, and the core inlet temperature sensor 142 may be a compressor outlet sensor and, more specifically, a fan outlet temperature sensor. The controller 130 receives an input from each of the fan inlet temperature sensor 148 and the core inlet temperature sensor 142 and, then, the controller 130 determines the water content of the volume of air 58 flowing into the turbine engine 10, and, more specifically, into the fan 38 based on the temperature increase from the fan inlet temperature sensor 148 to the core inlet temperature sensor 142. Although described with reference to the core inlet temperature sensor 142, the fan outlet temperature sensor may be located elsewhere downstream of the fan 38 to measure the pressure rise across the fan 38, such as within the bypass airflow passage 56 to measure the temperature of the bypass air 62.

Although described above as measuring a temperature increase across a compressor, such as the fan 38, the LPC 22, or the HPC 24, to determine the water content of the core air 64 upstream of the steam injection location, the temperature sensors may be positioned to measure the temperature increase across any portion of the core air flow path 33. For example, the LPC 22 and the HPC 24 may include a plurality of stages and the temperature sensors may be positioned to measure the temperature increase across one or more stages of the LPC 22 or the HPC 24. The relationship between the temperature increase and the moisture content of the air based on the temperature increase may vary depending upon the particular engine design. As part of an engine development program, for example, turbine engine 10 may be subjected to a series of tests and map the compressors, and empirically determine the relationship among pressure rise, temperature rise, and the water content of the core air 64 upstream of the steam injection location.

As noted above, the temperature increase results from the pressure increase in the core air 64. Thus, the plurality of sensors 136 may also include a plurality of pressure sensors that is positioned to measure the pressure increase across a compressor or a portion thereof. The controller 130 may determine the water content of the compressed air 65 upstream of the steam injection location using on the pressure increase, such as in conjunction with the temperature sensors discussed above. Accordingly, the plurality of the pressure sensors may be positioned similarly to the temperature sensors discussed above, but measuring pressure instead of temperature. More specifically, the plurality of sensors 136 may include (i) a core inlet pressure sensor 152 positioned similarly to the core inlet temperature sensor 142, (ii) an intermediate compressor pressure sensor 154 positioned similarly to the intermediate compressor temperature sensor 144, (iii) an HPC outlet pressure sensor 156 positioned similarly to the HPC outlet temperature sensor 146, and (iv) a fan inlet pressure sensor 158 positioned similarly to the fan inlet temperature sensor 148.

The pressure increase generated by the compressors discussed herein may be based on the speed of rotation of the compressor blades. Accordingly, the plurality of sensors 136 may also include one or more speed sensors located to detect the rotational speed of the compressor across which the temperature rise is being measured. For example, the compressors discussed herein are driven (rotated) by a shaft, and a speed sensor may be used to detect the rotational speed of the shaft. For example, an HP speed sensor 162 may be located to measure the rotational speed of the HP shaft 34, and a LP speed sensor 164 may be located to measure the rotational speed of the LP shaft 36. The controller is configured to receive an input from the speed sensor (e.g., HP speed sensor 162 or the LP speed sensor 164) and use the input from the speed sensor when determining the water content of the compressed air 65 upstream of the steam injection location.

Figure 3:
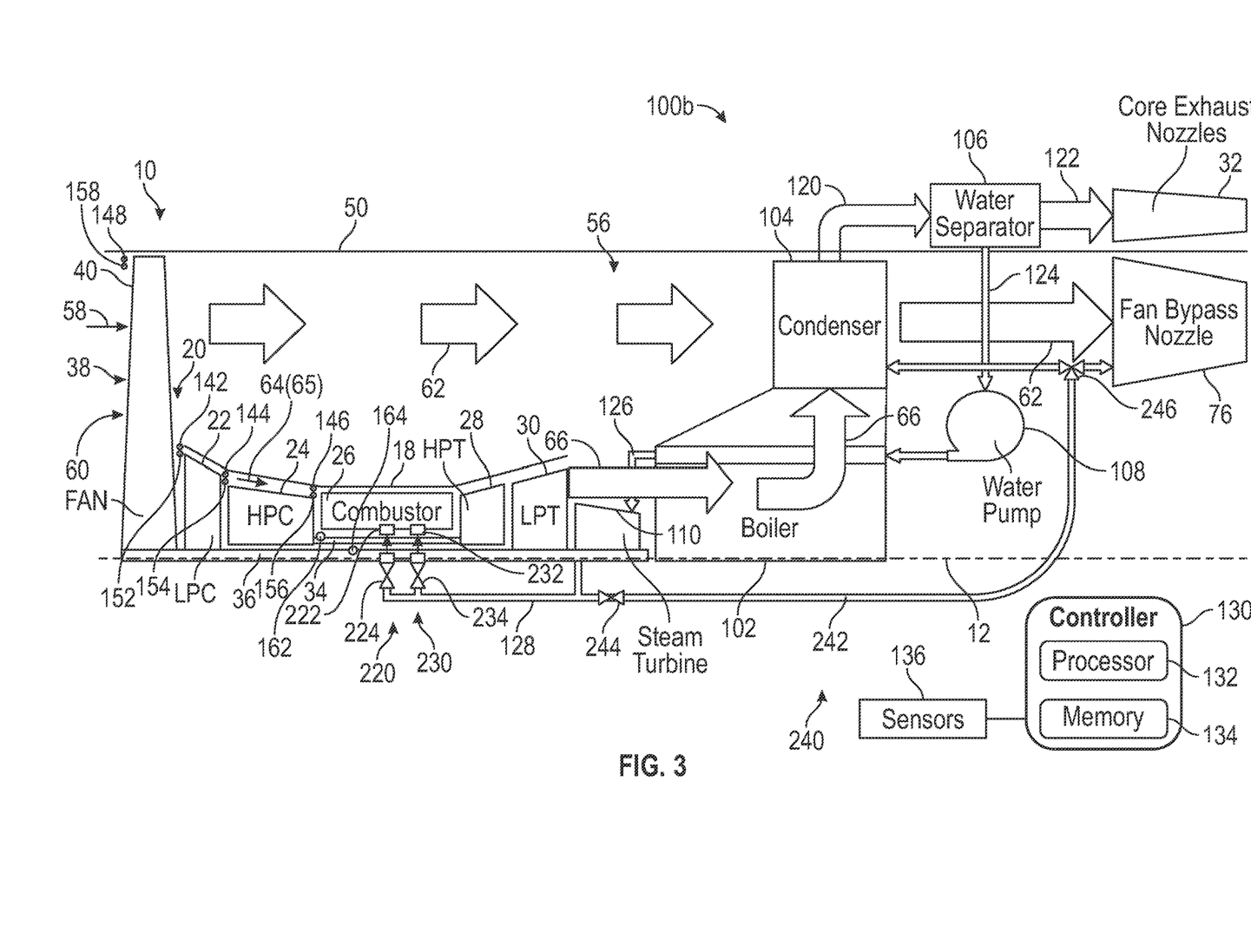
FIG. 3 is a schematic diagram of the turbine engine and a steam system according to an embodiment of the present disclosure.

FIG. 3 is a schematic diagram of the turbine engine 10 having a steam system 100b according to another embodiment of the present disclosure. For clarity with the other steam systems discussed herein, the steam system 100b of this embodiment will be referred to as a second steam system 100b. The second steam system 100b may be used as the steam system 100 in the turbine engine 10 shown in FIG. 1. The second steam system 100b is similar to the first steam system 100a discussed above with reference to FIG. 2. The same reference numerals will be used for components of the second steam system 100b that are the same as or similar to the components of the first steam system 100a discussed above. The description of these components above also applies to this embodiment, and a detailed description of these components is omitted here.

In the embodiment depicted in FIG. 2, one steam injection zone is depicted, but, in the embodiment depicted in FIG. 3, a plurality of steam injection zones is depicted to inject the steam 128 into the core air flow path 33, including a primary steam injection zone 220 and a secondary steam injection zone 230. Within each zone, the steam 128 may be injected into the zone using a plurality of steam injectors (i.e., primary steam injectors 222 or secondary steam injectors 232). Various suitable steam injectors may be used including, for example, nozzles and orifices formed in various components and fluidly coupled to the steam line delivering steam 128 from the steam turbine 110. Accordingly, the second steam system 100b includes two or more sets of steam injectors including a set of primary steam injectors 222 and a set of secondary steam injectors 224.

The primary steam injection zone 220 is located to inject at least a portion of the steam 128 into the primary air. The steam 128 may be injected into the combustor 26, such as into the combustion chamber and, more specifically, into the primary combustion zone. As depicted in FIG. 3, the primary steam injection zone 220 is the primary combustion zone. When the steam 128 is injected into the primary combustion zone, the primary steam injectors 222 may be the mixer assembly discussed above. Additionally, or alternatively, the primary steam injection zone 220 may be a steam injection zone upstream of the combustor 26 and downstream of the HPC 24.

The secondary steam injection zone 230 is located to inject a portion of the steam 128 into the core air flow path 33 at a location other than the primary steam injection zone 220. The secondary steam injection zone 230 may be a downstream steam injection zone located to inject steam 128 downstream of the primary steam injection zone 220 and/or the primary combustion zone. In the embodiment depicted in FIG. 3, the secondary steam injection zone 230 is a portion of the combustor downstream of the primary combustion zone, but the secondary steam injection zone 230 may be located at other downstream locations such as the HPT 28 (e.g., HPT stator vanes 68 and/or the HPT rotor blades 70) or the LPT 30 (e.g., the LPT stator vanes 72 or the LPT rotor blades 74). Although only one primary steam injection zone 220 is depicted in FIG. 3, the second steam system 100b may include a plurality of primary steam injection zones 220.

As discussed above, the steam 128 may be injected into the core air flow path 33 in a range of 20% to 50% of the mass flow through the core air flow path 33. To achieve the benefits of waste heat recovery discussed herein, this amount of steam 128 (water vapor) is beneficial when flowing through the turbine section 27 and, more specifically, the HPT 28 and the LPT 30. In addition, the desired amount of steam may vary throughout the flight of the aircraft based on operating conditions. Introducing the steam amounts discussed above such that all of the steam 128 flows through the primary combustion zone may cause issues with the stability of the flame and the flame dynamics in the combustion chamber. Accordingly, the steam 128 being injected at the primary steam injection zone 220 may be controlled to maintain the flow of steam through the primary combustion zone at desired levels. With the flow rate of the steam injected at the primary steam injection zone 220 being limited to achieve the desired steam levels for flame stability, the remaining portion of the steam 128 is injected into the core air flow path 33 at the one or more primary steam injection zones 220.

Each steam injection zone may include a steam flow control valve operable to control the flow of the steam 128 into the corresponding zone. More specifically, the primary steam injection zone 220 includes a primary steam flow control valve 224 to control the flow of the steam 128 into the primary steam injection zone 220 and, the secondary steam injection zone 230 includes a secondary steam flow control valve 234 to control the flow of the steam 128 into the secondary steam injection zone 230. Any suitable flow control valve may be used for the primary steam flow control valve 224 and the secondary steam flow control valve 234. The discussion above of suitable flow control valves for the steam control valve 112 in FIG. 2 also applies to the primary steam flow control valve 224 and the secondary steam flow control valve 234. The controller 130 may be communicatively and operatively coupled to each of the primary steam flow control valve 224 and the secondary steam flow control valve 234 to control primary steam flow control valve 224 and the secondary steam flow control valve 234 in a manner similar to the operation of the steam control valve 112 discussed above.

The second steam system 100b may also include one or more bypass flow paths. With the steam 128 being limited based on the water content of the compressed air 65 downstream of the steam injection zone, some of the steam 128 generated by the second steam system 100b may be diverted (redirected) from the core air flow path 33. The second steam system 100b may thus include a bypass flow path 240 that is selectively operable to redirect the steam 128 and to bypass at least the combustor 26. As shown in FIG. 3, for example, the second steam system 100b includes a steam bypass flow path 240 to bypass the combustor 26. The steam bypass flow path 240 includes a steam bypass line 242 fluidly connected to the steam line for the steam 128 downstream of the steam turbine 110 and upstream of the combustor 26. The steam bypass flow path 240 includes a steam bypass valve 244 located in the steam bypass line 242. The steam bypass valve 244 is operable to open and to direct the steam 128 through the steam bypass line 242, bypassing the combustor 26. The controller 130 may be operatively coupled to the steam bypass valve 244 to open the steam bypass valve 244 to bypass the combustor 26 and to direct the steam through the steam bypass line 242. The controller 130 may operate the steam bypass valve 244 based on the water content of the compressed air 65 upstream of the steam injection location in a manner similar to the operation of the steam control valve 112 discussed above. The steam bypass valve 244 may be any suitable valve including an isolation valve movable between an open position and a closed position.

The steam bypass line 242 may be fluidly connected to various locations within the second steam system 100b to bypass the combustor 26. For example, the steam bypass line 242 may be fluidly connected to the condenser 104 or to a position upstream of the condenser 104 allowing the steam 128 to flow and to mix with the combustion gases 66. The steam 128 flowing through the steam bypass line 242 may thus be recaptured by the condenser 104 and circulated through the second steam system 100b. Bypassing the steam 128 into the condenser 104, instead of the exhaust nozzle (e.g., the fan bypass nozzle 76), minimizes contrail formation. Instead of being recaptured, the steam 128 may be exhausted overboard, such as by being fluidly connected to an exhaust port. The exhaust port may be fluidly connected to the bypass airflow passage 56 or the fan bypass nozzle 76. In this way, the steam 128 may be exhausted into the bypass air 62, such as, for example, either upstream of the condenser 104 or downstream of the condenser 104. In some embodiments, the steam 128 may be selectively exhausted or recaptured. A selector valve 246 may be positioned in the steam bypass line 242 to fluidly couple the steam bypass line 242 to the outlets discussed above. Any suitable first selector valve 246 may be used, including a three-way valve.

Figure 4:
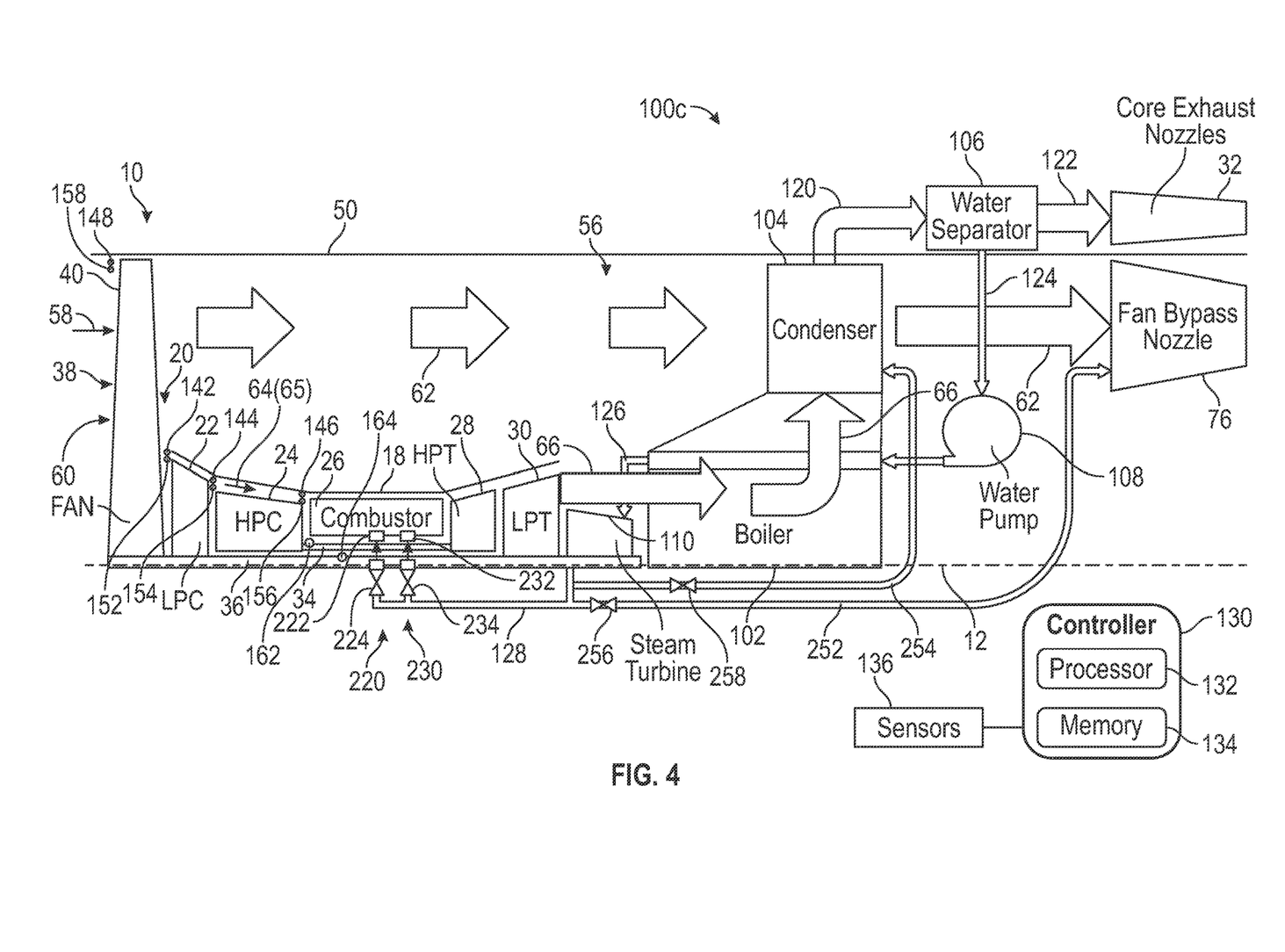
FIG. 4 is a schematic diagram of the turbine engine and a steam system according to an embodiment of the present disclosure.

FIG. 4 is a schematic diagram of the turbine engine 10 having a steam system 100c according to another embodiment of the present disclosure. For clarity with the other steam systems discussed herein, the steam system 100c of this embodiment will be referred to as a third steam system 100c. The third steam system 100c may be used as the steam system 100 in the turbine engine 10 shown in FIG. 1. The third steam system 100c is similar to the second steam system 100b discussed above with reference to FIG. 3. The same reference numerals will be used for components of the third steam system 100c that are the same as or similar to the components of the second steam system 100b discussed above. The description of these components above also applies to this embodiment, and a detailed description of these components is omitted here.

In the second steam system 100b, the bypass flow path 240 included a selector valve 246 positioned in the steam bypass line 242 to fluidly couple the steam bypass line 242 to the outlets discussed above. Instead of a selector valve 246, the third steam system 100b depicted in FIG. 4 includes two bypass lines (i.e., two steam bypass flow paths), a first steam bypass line 252 and a second steam bypass line 254, each fluidly coupled to one of the outlets discussed above. As depicted in FIG. 4, the first steam bypass line 252 is fluidly coupled to the fan bypass nozzle 76, and the second steam bypass line 254 is fluidly coupled to the condenser 104. Each bypass line includes a steam bypass valve operable in a manner similar to the steam bypass valve 244, discussed above. More specifically, a first steam bypass valve 256 is operable to open and to direct the steam 128 through the first steam bypass line 252 to the fan bypass nozzle 76, bypassing the combustor 26, and the second steam bypass valve 258 is operable to open and to direct the steam 128 through the second steam bypass line 254 to the condenser 104, bypassing the combustor 26.

Figure 5:
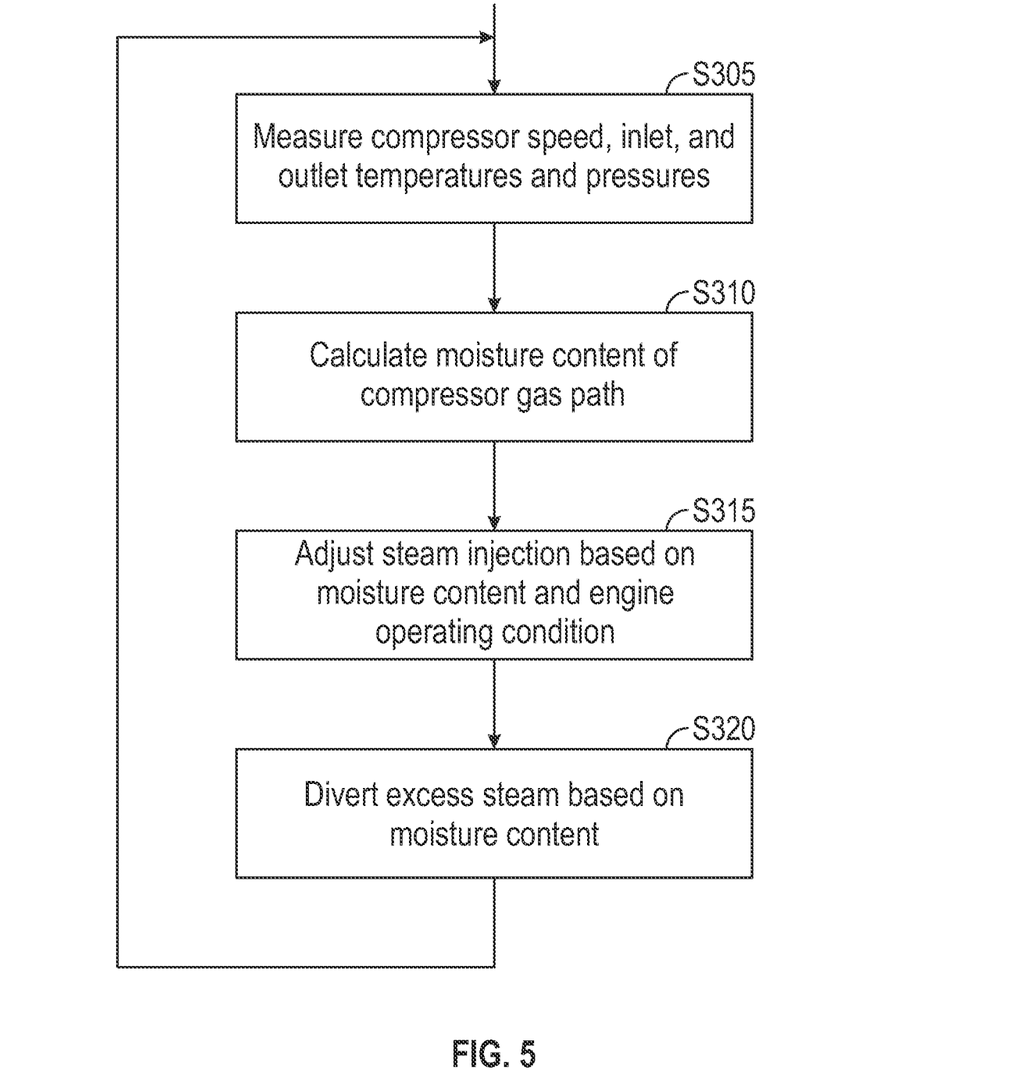
FIG. 5 is a flow chart showing a method of controlling the steam system shown in any one of FIGS. 2 to 4.

FIG. 5 is a flow chart showing a method of controlling the steam system shown in any one of FIGS. 2 to 4. Additional details of the method are described above relative to the operation and the description of the aforementioned components. This method may be implemented by the controller 130, and the controller 130 may be configured to perform the steps of the method discussed below. While the following discussion references the second steam system 100b, this discussion also applies to the first steam system 100a and the third steam system 100c.

The method may begin by measuring (or detecting), in step S302, the parameter indicative of the water content of the core air 64 upstream of the steam injection location using, for example, one or more of the plurality of sensors 136. More specifically, the temperature of the volume of air 58 and/or the core air 64 may be measured at one or more of the positions discussed above using one or more of the temperature sensors, such as the core inlet temperature sensor 142, the intermediate compressor temperature sensor 144, the HPC outlet temperature sensor 146, and the fan inlet temperature sensor 148. Similarly, the pressure of the volume of air 58 and/or the core air 64 may be measured at one or more of the positions discussed above using one or more of the pressure sensors, such as the core inlet pressure sensor 152, the intermediate compressor pressure sensor 154, the HPC outlet pressure sensor 156, and the fan inlet pressure sensor 158. In addition or alternatively, the speed of the compressors, such as the fan 38, the LPC 22, and/or the HPC 24, may be measured using, for example, the HP speed sensor 162 and/or the LP speed sensor 164.

Then, in step S310, the moisture content (e.g., water-to-air ratio) is calculated or otherwise determined, using, for example, the temperature rise approach based the temperature differential and the pressure rise across a compressor (e.g., the fan 38, the LPC 22, and/or the HPC 24). In step S315, the amount of steam injected into the core air flow path 33 is adjusted using one or more of the steam control valves, such as the primary steam flow control valve 224, the secondary steam flow control valve 234, or both. The excess steam is then diverted in step S320, by opening the primary steam flow control valve 224 and directs the steam through the steam bypass flow path 240 and, more specifically, through the steam bypass line 242.

When the aircraft (turbine engine 10) is operating in moisture laden atmospheric conditions, such as rain, hail, or clouds, for example, the air flowing into the turbine engine 10 and thus the core air 64 flowing into the core air flow path 33 includes water content. Embodiments discussed herein control the amount of steam injected into the core air 64 by the steam 128 based on the water content of the incoming core air, and the amount of steam 128 injected into the core air 64 by the steam system 100 may be reduced when the turbine engine 10 is operating in moisture laden atmospheric conditions as compared to other atmospheric conditions with a lower moisture content. Controlling the steam 128 in this manner using the systems described herein maintains a stable flame in the combustor and provides for desirable flame dynamics during combustion of the fuel, particularly, for highly reactive fuels such as diatomic hydrogen.

Further aspects of the present disclosure are provided by the subject matter of the following clauses.

A turbine engine for an aircraft, the turbine engine including a turbo-engine, a fan having a fan shaft coupled to the turbo-engine to rotate the fan shaft, and a steam system. The turbo-engine includes a core air flow path for core air to flow therethrough, a combustor, an engine shaft, and a turbine. The combustor is located in the core air flow path to receive compressed air and fluidly coupled to a fuel source to receive fuel. The fuel is injected into the combustor to mix with the compressed air to generate a fuel and air mixture. The fuel and air mixture is combusted in a primary combustion zone of the combustor to generate combustion gases. The turbine is located downstream of the combustor to receive the combustion gases and to cause the turbine to rotate. The turbine is coupled to the engine shaft to rotate the engine shaft when the turbine rotates. The steam system extracts water from the combustion gases and vaporizes the water to generate steam. The steam system is fluidly coupled to the core air flow path to inject the steam into the core air flow path at a steam injection location to add mass flow to the core air. The steam system includes a steam flow control valve operable to control the flow of the steam into the core air flow path. A sensor is located on the turbine engine to detect a parameter indicative of a core air water content, the core air water content being a water content of the core air upstream of the steam injection location. A controller is operatively coupled to the steam flow control valve to control a position of the steam flow control valve and an amount of the steam injected into the core air flow path at the steam injection location. The controller is configured to receive an input from the sensor, to determine the core air water content based on the input received from the sensor, and to change the position of the steam flow control valve and the amount of the steam injected into the core air flow path at the steam injection location based on the core air water content.

The turbine engine of the preceding clause, wherein the sensor is one of a temperature sensor or a pressure sensor.

The turbine engine of any preceding clause, wherein the core air flow path includes a core inlet, the sensor being located at the core inlet to detect, in the core inlet, the parameter indicative of the core air water content.

The turbine engine of any preceding clause, further comprising a nacelle circumferentially surrounding the fan, the nacelle defining a fan inlet for receiving a volume of air, the sensor being located at the fan inlet to detect, in the volume of air, the parameter indicative of the core air water content.

The turbine engine of the preceding clause, the sensor being located on the nacelle in the fan inlet.

The turbine engine of any preceding clause, wherein the steam flow control valve is a primary steam flow control valve operable to control the flow of the steam into a primary steam injection zone, the primary steam injection zone being a steam injection zone located in the core air flow path such that the steam injected into the primary steam injection zone flows into the primary combustion zone.

The turbine engine of any preceding clause, wherein the primary steam injection zone is the primary combustion zone.

The turbine engine of any preceding clause, wherein the turbo-engine includes a compressor located in the core air flow path upstream of the combustor to compress the core air to generate the compressed air, the sensor being a compressor discharge sensor located at an outlet of the compressor or downstream thereof to detect, in the compressed air, the parameter indicative of the core air water content.

The turbine engine of the preceding clause, wherein the turbo-engine includes a shaft coupled to the compressor to rotate the compressor and a speed sensor located to detect a rotational speed of the shaft, the controller being configured to receive an input from the speed sensor and to use the input from the speed sensor when determining the core air water content.

The turbine engine of any preceding clause, wherein the compressor discharge sensor is one sensor of a plurality of sensors each located on the turbine engine to detect a parameter indicative of the core air water content, another sensor of the plurality of sensors being a compressor inlet sensor located at an inlet of the compressor or upstream thereof to detect the parameter indicative of the core air water content.

The turbine engine of the preceding clause, wherein each of the compressor inlet sensor and the compressor discharge sensor is a temperature sensor, and the controller is configured determine the core air water content based on a temperature increase from the compressor inlet sensor to the compressor discharge sensor.

The turbine engine of any preceding clause, wherein each of the compressor inlet sensor and the compressor discharge sensor is a pressure sensor, and the controller is configured determine the core air water content using a pressure increase from the compressor inlet sensor to the compressor discharge sensor.

The turbine engine of any preceding clause, wherein the steam system includes a steam bypass flow path selectively operable to redirect at least a portion of the steam to bypass the core air flow path, the controller being configured to redirect a portion of the steam through the steam bypass flow path based on the core air water content.

The turbine engine of the preceding clause, wherein the steam bypass flow path is fluidly connected to an exhaust port to selectively exhaust the steam.

The turbine engine of any preceding clause, further comprising a bypass airflow passage for bypass air, the steam bypass flow path being fluidly connected to the bypass airflow passage to selectively direct the flow of steam into the bypass airflow passage.

The turbine engine of any preceding clause, wherein the steam system includes a boiler located downstream of the combustor, the boiler receiving water and being fluidly connected to the combustor to receive the combustion gases and to boil the water to generate the steam.

The turbine engine of the preceding clause, further comprising a condenser located downstream of the boiler to condense water from the combustion gases and to generate an exhaust-water mixture.

The turbine engine of the preceding clause, the steam bypass flow path being fluidly connected to the condenser to selectively direct the flow of the steam into the condenser.

The turbine engine of any preceding clause, wherein the steam bypass flow path includes a valve operable to selectively redirect the steam to at least one of the condenser or the exhaust port.

The turbine engine of any preceding clause, wherein the steam bypass flow path is fluidly connected to the steam system at a location downstream of the boiler and upstream of the core air flow path.

The turbine engine of any preceding clause, wherein the bypass flow path is a steam bypass flow path that is fluidly connected to the steam system at a location downstream of the boiler and upstream of the combustor.

The turbine engine of any preceding clause, further comprising a bypass airflow passage for bypass air, the water bypass flow path fluidly connected to the bypass airflow passage to selectively direct the flow of steam into the bypass airflow passage.

The turbine engine of any preceding clause, wherein the bypass airflow passage includes a bypass airflow exhaust nozzle for exhausting the bypass air, the steam bypass flow path fluidly connected to the bypass airflow exhaust nozzle.

The turbine engine of any preceding clause, wherein the steam bypass flow path is fluidly connected to the bypass airflow passage at a position downstream of the condenser.

The turbine engine of any preceding clause, wherein the steam bypass flow path is fluidly connected to the bypass airflow passage at a position upstream of the condenser.

The turbine engine of any preceding clause, wherein the steam system includes a steam turbine fluidly coupled to the boiler to receive the steam from the boiler and to cause the steam turbine to rotate, the steam turbine being coupled to the engine shaft to rotate the engine shaft when the steam turbine rotates.

The turbine engine of the preceding clause, wherein the steam bypass flow path is fluidly connected to the steam system at a location downstream of the steam turbine.

The turbine engine of the preceding clause, wherein the turbo-engine includes a compressor positioned in the core air flow path upstream of the combustor to compress core air to generate the compressed air.

The turbine engine of any preceding clause, wherein the turbo-engine includes a combined fuel and steam nozzle assembly to inject both the steam and the fuel into the primary combustion zone.

The turbine engine of any preceding clause, wherein the turbine is a high-pressure turbine.

The turbine engine of any preceding clause, wherein the turbine is a low-pressure turbine.

The turbine engine of any preceding clause, wherein the turbo-engine includes a high-pressure compressor positioned in the core air flow path upstream of the combustor to generate the compressed air.

The turbine engine of any preceding clause, wherein the engine shaft is a high-pressure shaft.

The turbine engine of any preceding clause, wherein the high-pressure compressor is driven by the high-pressure shaft to compress the core air flowing through the core air flow path and to generate the compressed air.

The turbine engine of any preceding clause, wherein the turbo-engine includes a low-pressure compressor positioned in the core air flow path upstream of the high-pressure compressor to generate the compressed air.

The turbine engine of any preceding clause, wherein the turbo-engine includes a low-pressure turbine positioned in the core air flow path downstream of the high-pressure turbine to receive the combustion gases and to cause the turbine to rotate.

The turbine engine of any preceding clause, wherein the turbo-engine includes a low-pressure shaft, the low-pressure turbine coupled to the low-pressure shaft to rotate the low-pressure shaft when the low-pressure turbine rotates.

The turbine engine of any preceding clause, wherein the turbo-engine includes a compressor positioned in the core air flow path upstream of the combustor to compress core air to generate the compressed air.

The turbine engine of the preceding clause, wherein the compressor is driven by the high-pressure shaft to compress the core air flowing through the core air flow path and to generate the compressed air.

The turbine engine of any preceding clause, wherein the turbine is a low-pressure turbine, and a steam injection zone is in the low-pressure turbine.

The turbine engine of the preceding clause, wherein the low-pressure turbine includes a turbine rotor including a plurality of rotor blades, and the steam injection zone is the plurality of rotor blades.

The turbine engine of any preceding clause, wherein the engine shaft is a low-pressure shaft and the turbine is a low-pressure turbine.

The turbine engine of any preceding clause, wherein the fan shaft is coupled to the low-pressure shaft to be driven by the low-pressure shaft.

The turbine engine of any preceding clause, further comprising a nacelle circumferentially surrounding the fan.

The turbine engine of any preceding clause, wherein the fan includes a plurality of fan blades that rotates to generate a volume of air.

The turbine engine of the preceding clause, wherein the nacelle defines a bypass airflow passage between the nacelle and the turbo-engine. The volume of air from the fan is split and flows into the bypass airflow passage as bypass air and flows into the core air flow path as the core air.

The turbine engine of any preceding clause, wherein the steam system includes a boiler located downstream of the combustor, the boiler receiving the extracted water and being fluidly connected to the combustor to receive the combustion gases and to boil the water to generate the steam.

The turbine engine of the preceding clause, wherein the steam system includes a steam turbine. The steam turbine is fluidly coupled to the boiler to receive the steam from the boiler and to cause the steam turbine to rotate.

The turbine engine of the preceding clause, wherein the steam turbine is coupled to the engine shaft to rotate the engine shaft when the steam turbine rotates.

The turbine engine of any preceding clause, wherein the steam system includes a condenser downstream of the turbine to receive the combustion gases and to condense the water from the combustion gases.

The turbine engine of the preceding clause, wherein the condenser is located downstream of the boiler.

The turbine engine of any preceding clause, wherein the condenser is located in the bypass airflow passage for bypass air to cool the combustion gases and to condense the water from the combustion gases.

The turbine engine of any preceding clause, wherein the steam system includes a water separator located downstream of the condenser, the water separator separating the water from an exhaust-water mixture.

The turbine engine of any preceding clause, wherein the water separator is fluidly connected to the boiler to provide the water to the boiler.

The turbine engine of the preceding clause, wherein the water separator is a cyclonic separator.

The turbine engine of any preceding clause, further comprising a water pump in fluid communication with the water separator and with the boiler to direct the flow of water from the water separator into the boiler.

A method of operating a turbine engine for an aircraft having a steam system. The method includes determining a core air water content, the core air water content being a water content of air in a core air flow path. The method also includes injecting fuel into a combustor positioned in the core air flow path to receive the compressed air, mixing the fuel with the compressed air to generate a fuel and air mixture, combusting the fuel and air mixture in a primary combustion zone of the combustor to generate combustion gases. The method also includes extracting water from the combustion gases, vaporizing the water to generate steam, and injecting the steam into the core air flow path at a steam injection location to add mass flow to the core air. The method further includes determining the amount of the steam injected into the core air flow path at the steam injection location based on the core air water content.

The method of the preceding clause, wherein determining the core air water content measuring a water content of a volume of air flowing into a fan inlet.

The method of any preceding clause, wherein determining the core air water content includes measuring a water content of a volume of air flowing into a core inlet.

The method of any preceding clause, wherein determining the core air water content includes measuring a water content of a core air flowing through the core air flow path.

The method of any preceding clause, wherein determining the core air water content includes measuring a water content of the compressed air in a compressor.

The method of any preceding clause, wherein determining the core air water content includes measuring a temperature difference between air flowing into an inlet of a compressor and air being discharged from the compressor.

The method of any preceding clause, wherein the compressor is the compressor of any one of the turbine engines of the preceding clauses.

The method of any preceding clause, wherein determining the core air water content includes measuring a pressure increase between air flowing into an inlet of a compressor and air being discharged from the compressor.

The method of any preceding clause, wherein determining the core air water content includes measuring the speed of rotation of a compressor.

The method of the preceding clause, wherein the compressor is the compressor of the turbine engine of any preceding clause.

The method of any preceding clause, further comprising operating the turbine engine of any preceding clause.

The turbine engine of any preceding clause, further comprising a controller configured to execute the method of any preceding clause.

Although the foregoing description is directed to certain embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A turbine engine for an aircraft, the turbine engine comprising:
   a turbo-engine including:
      a core air flow path for core air to flow therethrough;
      a compressor located in the core air flow path to compress the core air to generate compressed air;
      a combustor located in the core air flow path downstream of the compressor to receive the compressed air from the compressor and fluidly coupled to a fuel source to receive fuel, the fuel being injected into the combustor to mix with the compressed air to generate a fuel and air mixture, the fuel and air mixture being combusted in a primary combustion zone of the combustor to generate combustion gases;
      an engine shaft coupled to the compressor to rotate the compressor; and
      a turbine located downstream of the combustor to receive the combustion gases and to cause the turbine to rotate, the turbine coupled to the engine shaft to rotate the engine shaft when the turbine rotates;
   a fan having a fan shaft coupled to the turbo-engine to rotate the fan shaft;
   a steam system extracting water from the combustion gases and vaporizing the extracted water to generate steam, the steam system being fluidly coupled to the core air flow path to inject the steam into the core air flow path at a steam injection location to add mass flow to the core air, the steam system including a steam flow control valve operable to control the flow of the steam into the core air flow path;
   one or more sensors located on the turbine engine to detect a parameter indicative of a core air water content, the core air water content being a water content of the core air upstream of the steam injection location, at least one of the one or more sensors being a compressor discharge sensor located at an outlet of the compressor or downstream thereof to detect, in the compressed air, the parameter indicative of the core air water content;
   a speed sensor located to detect a rotational speed of the engine shaft; and
   a controller operatively coupled to the steam flow control valve to control a position of the steam flow control valve and an amount of the steam injected into the core air flow path at the steam injection location, wherein the controller is configured to:
      receive an input from the one or more sensors and an input from the speed sensor, to determine the core air water content based on the input received from the one or more sensors and the input received from the speed sensor; and
   change the position of the steam flow control valve and the amount of the steam injected into the core air flow path at the steam injection location based on the core air water content.

2. The turbine engine of claim 1, wherein the compressor discharge sensor is one of a temperature sensor or a pressure sensor.

3. The turbine engine of claim 1, wherein the core air flow path includes a core inlet, another sensor of the one or more sensors being located at the core inlet to detect, in the core inlet, the parameter indicative of the core air water content.

4. The turbine engine of claim 1, further comprising a nacelle circumferentially surrounding the fan, the nacelle defining a fan inlet for a volume of air, another sensor of the one or more sensors being located at the fan inlet to detect, in the volume of air, the parameter indicative of the core air water content.

5. The turbine engine of claim 4, wherein another sensor of the one or more sensors is located on the nacelle in the fan inlet.

6. The turbine engine of claim 1, wherein the steam flow control valve is a primary steam flow control valve operable to control the flow of the steam into a primary steam injection zone, the primary steam injection zone being a steam injection zone located in the core air flow path such that the steam injected into the primary steam injection zone flows into the primary combustion zone.

7. The turbine engine of claim 6, wherein the primary steam injection zone is the primary combustion zone.

8. The turbine engine of claim 1, wherein another sensor of the one or more sensors is a compressor inlet sensor located at an inlet of the compressor or upstream thereof to detect the parameter indicative of the core air water content.

9. The turbine engine of claim 8, wherein each of the compressor inlet sensor and the compressor discharge sensor is a temperature sensor, and the controller is configured to determine the core air water content based on a temperature increase from the compressor inlet sensor to the compressor discharge sensor.

10. The turbine engine of claim 8, wherein each of the compressor inlet sensor and the compressor discharge sensor is a pressure sensor, and the controller is configured to determine the core air water content of using a pressure increase from the compressor inlet sensor to the compressor discharge sensor.

11. A turbine engine for an aircraft, the turbine engine comprising:
a turbo-engine including:
a core air flow path for core air to flow therethrough;
a combustor located in the core air flow path to receive compressed air and fluidly coupled to a fuel source to receive fuel, the fuel being injected into the combustor to mix with the compressed air to generate a fuel and air mixture, the fuel and air mixture being combusted in a primary combustion zone of the combustor to generate combustion gases;
an engine shaft; and
a turbine located downstream of the combustor to receive the combustion gases and to cause the turbine to rotate, the turbine coupled to the engine shaft to rotate the engine shaft when the turbine rotates;
a fan having a fan shaft coupled to the turbo-engine to rotate the fan shaft;
a steam system extracting water from the combustion gases and vaporizing the extracted water to generate steam, the steam system being fluidly coupled to the core air flow path to inject the steam into the core air flow path at a steam injection location to add mass flow to the core air, the steam system including a steam flow control valve operable to control the flow of the steam into the core air flow path and a steam bypass flow path selectively operable to redirect at least a portion of the steam to bypass the core air flow path;
a sensor located on the turbine engine located to detect a parameter indicative of a core air water content, the core air water content being a water content of the core air upstream of the steam injection location; and
a controller operatively coupled to the steam flow control valve to control a position of the steam flow control valve and an amount of the steam injected into the core air flow path at the steam injection location, wherein the controller is configured to:
receive an input from the sensor, to determine the core air water content based on the input received from the sensor; and
adjust the amount of the steam injected into the core air flow path at the steam injection location, based on the determined core air water content, by one or both of:
changing the position of the steam flow control valve; or
redirecting the at least portion of the steam through the steam bypass flow path.

12. The turbine engine of claim 11, wherein the controller is further configured to, when the at least portion of the steam is redirected through the steam bypass flow path, selectively redirect the at least portion of the steam to one of an exhaust port or a bypass airflow passage of the turbine engine or to a condenser of the steam system.

13. The turbine engine of claim 11, wherein the sensor is one of a temperature sensor or a pressure sensor.

14. The turbine engine of claim 11, wherein the steam bypass flow path is fluidly connected to an exhaust port to selectively exhaust the steam.

15. The turbine engine of claim 11, further comprising a bypass airflow passage for bypass air, the steam bypass flow path being fluidly connected to the bypass airflow passage to selectively direct the flow of steam into the bypass airflow passage.

16. The turbine engine of claim 11, wherein the steam system further includes a boiler located downstream of the combustor that receives the extracted water, the boiler being fluidly connected to the combustor to receive the combustion gases and to boil the extracted water to generate the steam.

17. The turbine engine of claim 16, further comprising a condenser located downstream of the boiler to condense the extracted water from the combustion gases and to generate an exhaust-water mixture, the steam bypass flow path being fluidly connected to the condenser to selectively direct the flow of steam into the condenser.

18. The turbine engine of claim 16, wherein the steam bypass flow path is fluidly connected to the steam system at a location downstream of the boiler and upstream of the core air flow path.

19. The turbine engine of claim 16, wherein the steam system includes a steam turbine fluidly coupled to the boiler to receive the steam from the boiler and to cause the steam turbine to rotate, the steam turbine being coupled to the engine shaft to rotate the engine shaft when the steam turbine rotates.

20. The turbine engine of claim 19, wherein the steam bypass flow path is fluidly connected to the steam system at a location downstream of the steam turbine.

\* \* \* \* \*